United States Patent
Childs

(10) Patent No.: US 11,228,244 B2
(45) Date of Patent: Jan. 18, 2022

(54) POWER CONVERTER SUPPORTING MULTIPLE HIGH DL/DT LOADS

(71) Applicant: Dialog Semiconductor (UK) Limited, London (GB)

(72) Inventor: Mark Childs, Swindon (GB)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 16/581,863

(22) Filed: Sep. 25, 2019

(65) Prior Publication Data
US 2021/0091659 A1 Mar. 25, 2021

(51) Int. Cl.
*H02M 3/158* (2006.01)
*H02M 3/156* (2006.01)
*H02M 1/32* (2007.01)
*H02M 1/00* (2006.01)

(52) U.S. Cl.
CPC ......... *H02M 3/1566* (2021.05); *H02M 1/008* (2021.05); *H02M 1/32* (2013.01); *H02M 3/1584* (2013.01)

(58) Field of Classification Search
CPC ....... H02M 1/0032; H02M 2001/0032; H02M 3/1566; H02M 1/32
See application file for complete search history.

(56) References Cited

U.S. PATENT DOCUMENTS

| | | | |
|---|---|---|---|
| 10,013,010 B1 | 7/2018 | Ock et al. | |
| 10,291,117 B2 * | 5/2019 | Petersen | H02M 3/156 |
| 2002/0144163 A1 | 10/2002 | Goodfellow et al. | |
| 2004/0232899 A1 | 11/2004 | Herbert | |
| 2009/0279224 A1 * | 11/2009 | Ayyanar | H02M 3/1584 361/111 |
| 2012/0326691 A1 * | 12/2012 | Kuan | H02M 3/158 323/299 |
| 2014/0285014 A1 | 9/2014 | Calhoun et al. | |
| 2015/0277526 A1 * | 10/2015 | Uehara | G06F 1/3206 713/300 |
| 2016/0094040 A1 * | 3/2016 | Krolak | H02M 7/493 318/504 |

(Continued)

OTHER PUBLICATIONS

German Office Action, File No. 10 2020 200 517.6, Applicant: Dialog Semiconductor (UK) Limited, dated Jul. 2, 2020, 8 pages.

*Primary Examiner* — Alex Torres-Rivera
(74) *Attorney, Agent, or Firm* — Saile Ackerman LLC; Stephen B. Ackerman

(57) ABSTRACT

It is an object of one or more embodiments of the present disclosure to provide a Multiple-Inductor Multiple-Output (MIMO) switching converter to supply several different output voltages. The combination of this MIMO converter with a booster circuit supplies one or more individual cores with current that bypasses the parasitic network. The booster circuit has a wider bandwidth or a faster response when compared to the main MIMO switching converter. The MIMO booster circuit can supply a number of cores with only a single set of shared inductors. The main advantages include a lower component count and a reduced printed circuit board footprint to support multiple cores in a Multiple-Inductor Multiple-Output. The present disclosure makes use of the low duty-cycle of the power peaks and the low statistical likelihood of these peaks occurring for all cores simultaneously.

15 Claims, 10 Drawing Sheets

(56) References Cited

U.S. PATENT DOCUMENTS

| | | |
|---|---|---|
| 2016/0211750 A1 | 7/2016 | Coleman et al. |
| 2017/0179887 A1* | 6/2017 | Henzler ................. H03F 1/025 |
| 2017/0338662 A1 | 11/2017 | Suton et al. |
| 2018/0348833 A1* | 12/2018 | Beeston ................... G06F 1/28 |
| 2019/0044341 A1* | 2/2019 | Liu ........................... G05F 1/67 |
| 2021/0036596 A1* | 2/2021 | Jeon ....................... H02M 1/00 |

* cited by examiner

POWER CONVERTER SUPPORTING MULTIPLE HIGH DL/DT LOADS

BACKGROUND

Field

The present disclosure relates generally to a DC-DC power converter, and specifically to a DC-DC power converter supporting multiple high dl/dt loads.

Background

Portable electronic equipment has become increasingly sophisticated and feature rich, necessitating high performance computing elements, including multiple processor architectures and the associated subsystems. For clarity, the individual microprocessor and their related subsystems are referred to as cores, or core loads. At the same time, power consumption and the resulting battery life remain critical performance criteria. The combination places a great significance on the power supply architecture of the portable device.

The following three performance criteria are of importance in DC-DC power converters: transient load response, low load power efficiency, and the ability to provide each core with scalable output voltage.

Many high performance cores require fast surges of energy over a short duration of time, as denoted by the change in current with respect to time, or (dl/dt). This will be referred to for purposes of this disclosure as a load transient event. This is mainly due to the following factors. First, in order to reduce power consumption, cores that are not in current use are placed in a low power or sleep mode. In order to further reduce power consumption, the core is required to enter and exit the sleep mode rapidly. Many cores of computative intensive functions require a large amount of input current once the core is brought out of the sleep mode.

The operating efficiency of a power converter varies over the specified load range. Typically, the operating efficiency is optimized towards the higher load ranges. However, due to the varying nature of the operating conditions of a portable device, many cores may spend a large percentage of time (operating duty cycle) in the sleep mode that still requires a regulated voltage source. Since a power converter's operating efficiency is optimized at the higher load ranges, the operating efficiency at low load, corresponding to sleep mode conditions, has a great impact on the overall battery life of the portable device. Therefore, low load efficiency is a key design consideration.

It is advantageous to provide a core regulated output voltage that is scalable depending on the operating condition. For example, it may be beneficial for the core to run on a lower regulated voltage level, while running on the lower load ranges, and run on higher input voltages as the load of the core increases. The power converter not only needs to be able to provide a regulated output voltage over the entire voltage range, but there must be a mechanism for the power converter to detect the desired output voltage required by the core at that particular instance.

Prior art power converter architectures include Multiple-Inductor/Single Output (MISO) Power Converters, Multi-Inductor/Multi-Output (MIMO) Converters, and Multi-Inductor/Multi-Output (MIMO) Converter with Boosters for High dv/dt Cores.

FIG. 1 illustrates 100, a prior art architecture where a single power converter supplies a single output, which provides a regulated output to all three cores 130. A typical topology that is used is commonly referred to as a multi-phase buck converter, or Multiple-Inductor/Single Output (MISO) Power Converter. As shown in FIG. 1, the power converter is an asymmetrical multi-phase buck converter 110. One advantage of the asymmetrical buck converter is the operating efficiency can be optimized across all load ranges, including low-load conditions. As shown in FIG. 1, the power converter 110 contains multiple phases, with some phases operating in valley mode and others in peak mode, for operation in discontinuous conduction (DCM) and/or continuous conduction (CCM) modes. Also as shown, different inductor L sizes are typically used.

However, the architecture of FIG. 1 has two drawbacks. First, because of size constraints, the power converter is not located in close proximity to the cores. The relatively long routing traces increase the parasitic elements in 120. This adds signal delays and loop stability challenges, which prevent optimized transient load performance. The second drawback is that the output voltage level cannot be scaled on a per core basis.

FIG. 2 illustrates 200, a prior art architecture where some of the limitations of the power converter shown in FIG. 1 are overcome. The power converter in FIG. 2 shows a Multiple-Inductor/Multiple-Output Power Converter 210. It shares a common advantage with the MISO power converter as the operating efficiency is optimized across the entire load range, including low-load conditions. Further, by employing a switching network 215, the MIMO power converter allows for voltage scaling for each individual core 230, by providing multiple outputs at different output voltages as defined by the individual core operating condition.

However, as with the architecture in FIG. 1, FIG. 2 also requires relatively long routing traces resulting in signal delays and loop stability challenges caused by large parasitic elements in 220, preventing optimized transient load performance.

FIG. 3 illustrates 300, a prior art architecture where the poor transient performance from the architecture shown in FIG. 2 is addressed. The Multi-Inductor/Multi-Output (MIMO) Converter provides a booster circuit 340 for the cores 330 that exhibit large transient loads in 320. The booster circuit may or may not have communication with the MIMO power converter 310.

One example of independent operation is for the booster to be enabled when a low-voltage threshold is reached, and disabled when a high-voltage threshold is reached. For systems where the output voltage is scaled (operate at various regulated output levels), the low-voltage and high-voltage thresholds will required to be scaled accordingly.

SUMMARY

Accordingly, it is an object of one or more embodiments of the present disclosure to provide a Multiple-Inductor Multiple-Output (MIMO) buck to supply several different output voltages, in combination with a booster circuit that supplies an individual core with current that bypasses the parasitic network.

It is further an object of one or more embodiments of the disclosure for the booster circuit to supply a number of cores with only a single set of shared inductors.

Still further, it is an object of one or more embodiments of the disclosure for the booster circuit to have a wider bandwidth or a faster response when compared to the main MIMO buck. Other objects will appear hereinafter.

The above and other objects of the present disclosure may be accomplished in the following manner. A dual MIMO system for a DC-DC power converter is disclosed, comprising a main Multiple-Inductor Multiple-Output (MIMO) switching converter, configured as a primary power source, to supply several different output voltages, and a MIMO booster circuit configured to supply an individual core with current and to bypass a parasitic network, and further comprising a single set of shared inductors.

The above and other objects of the present disclosure may be further accomplished with a method for a method of operating a dual MIMO DC-DC power converter. The steps include providing a main Multiple-Inductor Multiple-Output (MIMO) switching converter, configured to provide output voltage to a plurality of core loads. The steps also include supplying the plurality of core loads with current during a load transient event, using a MIMO booster circuit connected to each of the plurality of core loads.

In various embodiments the function may be achieved where the main MIMO switching converter is a symmetrical multi-phase buck converter.

In various embodiments the function may be achieved where the main MIMO switching converter is an asymmetrical multi-phase buck converter.

In various embodiments the function may be achieved in a Power Management Integrated Circuit (PMIC).

In various embodiments the function may be achieved in a System on a Chip (SOC).

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure provides a Multiple-Inductor Multiple-Output (MIMO) buck to supply several different output voltages. The combination of this MIMO with a booster circuit supplies an individual core with current that bypasses the parasitic network. The booster circuit has a wider bandwidth or a faster response when compared to the main MIMO buck. The MIMO booster circuit can supply a number of cores with only a single set of shared inductors.

Figure 1:
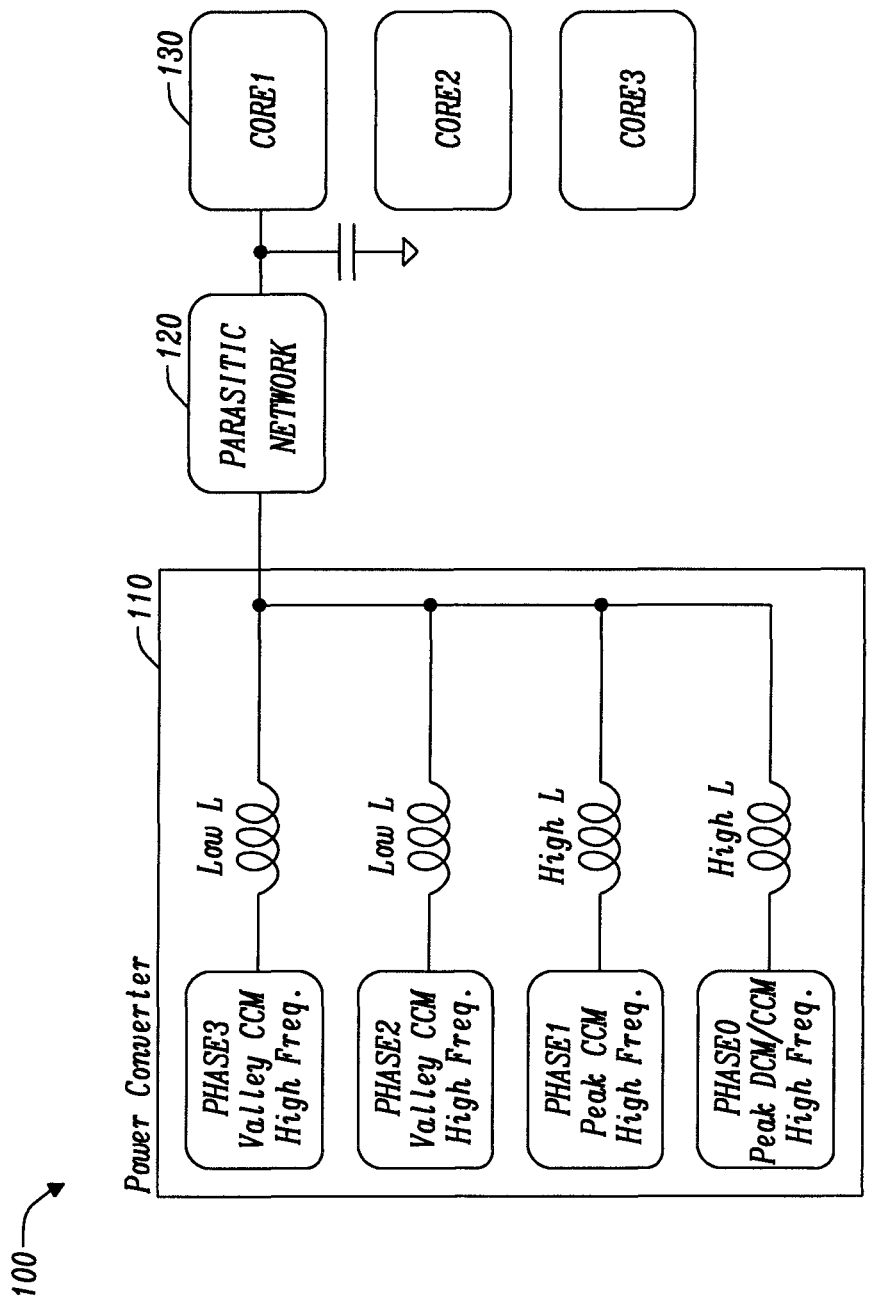
FIG. 1 illustrates a prior art architecture where a power converter supplies a single output, with a Multiple-Inductor/Single Output (MISO) Power Converter.
Figure 2:
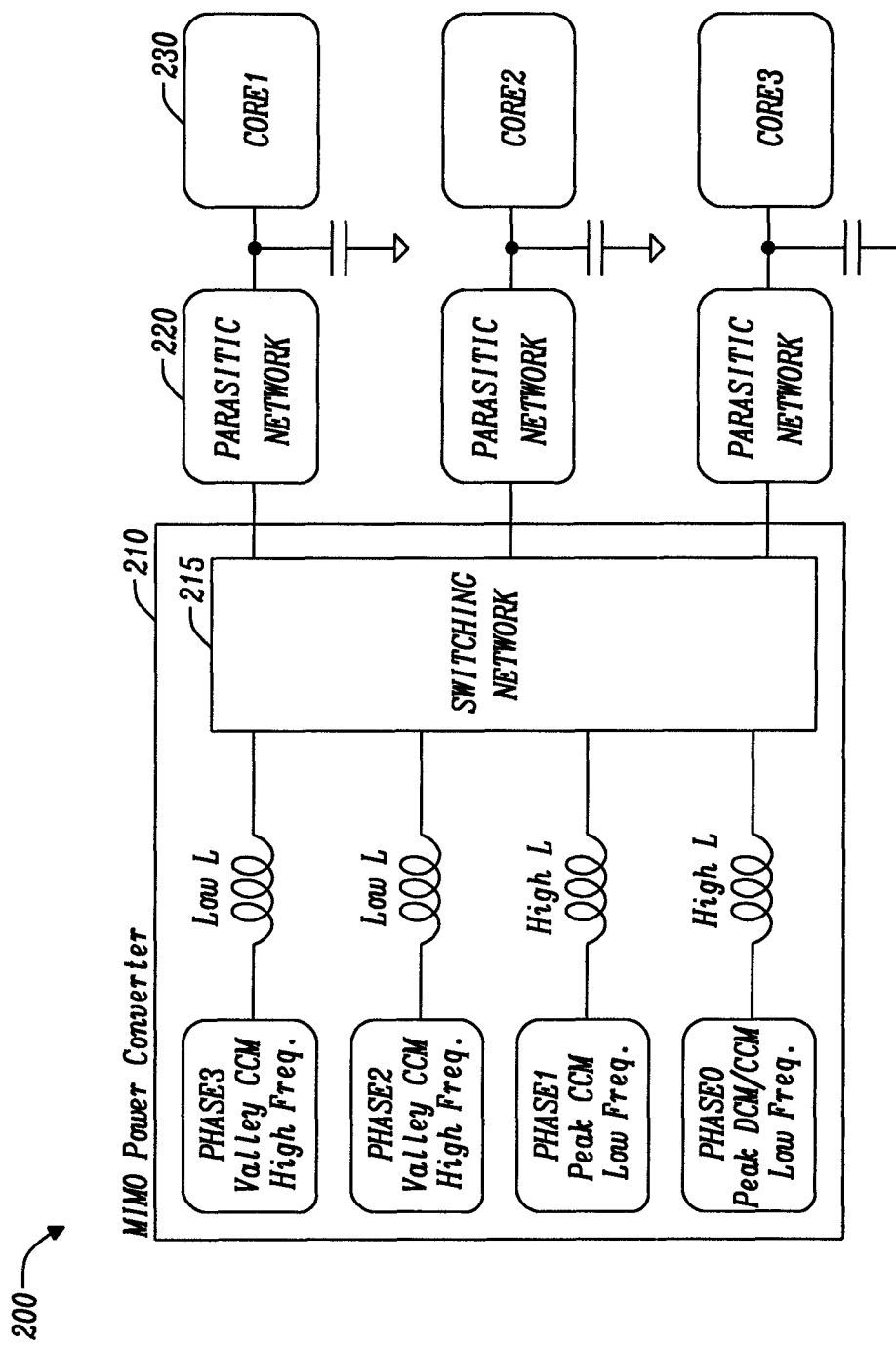
FIG. 2 illustrates a prior art architecture where some of the limitations of the power converter shown in FIG. 1 are overcome, with a Multiple-Inductor/Multiple-Output Power Converter.

The invention improves on the prior art illustrated in FIG. 1 and FIG. 2, in that it provides point of load (POL) support for high dI/dt cores. Further, it improves on the prior art of FIG. 3 by providing a centralized resource, versus a dedicated booster circuit for each core. There are a number of advantages of a centralized resource to provide POL support for high dI/dt cores, as will be discussed below.

Figure 4:
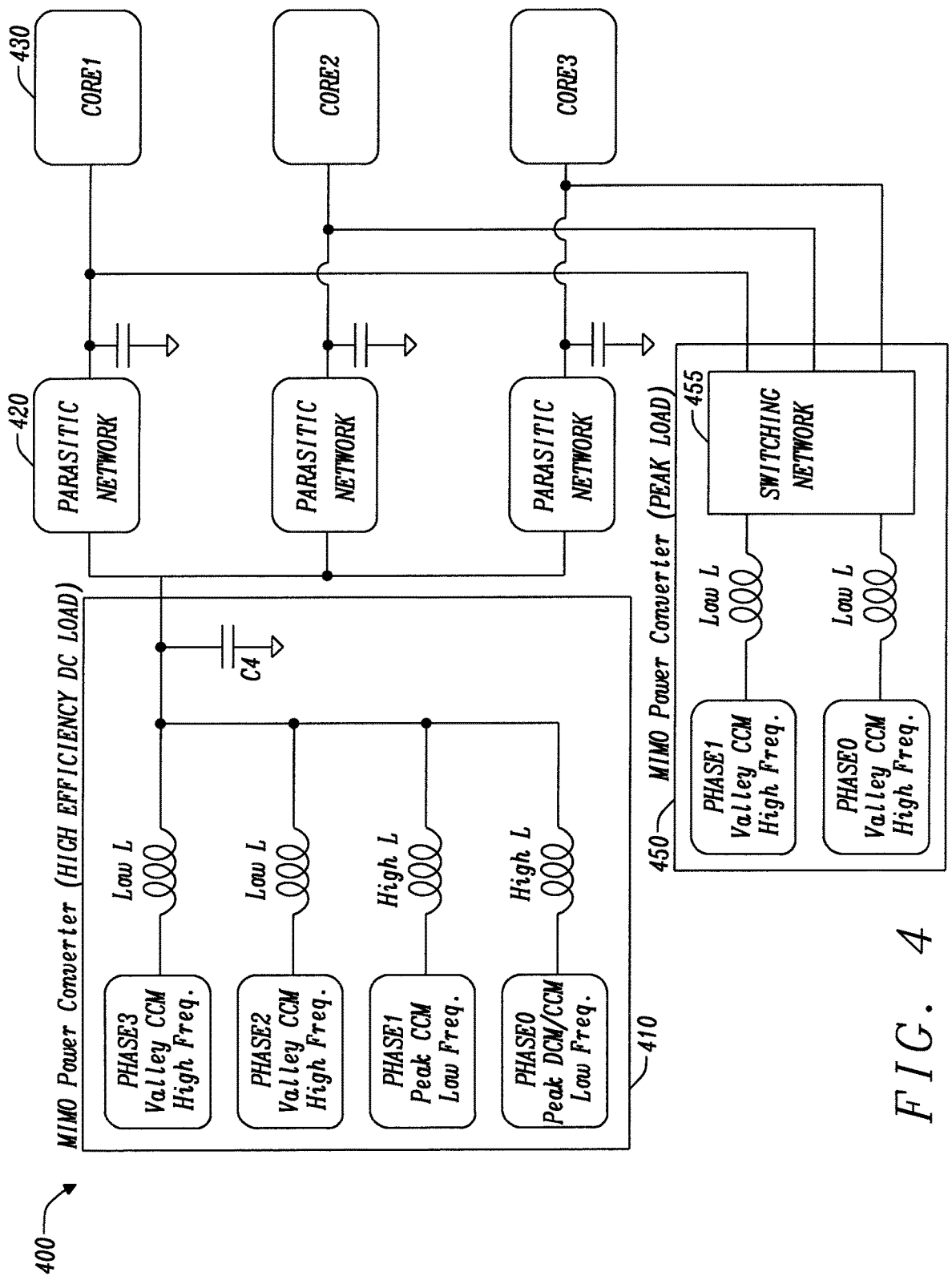
FIG. 4 illustrates a dual MIMO system, where a high efficiency MIMO is used as the primary power source, embodying the principles of the disclosure.

FIG. 4 illustrates 400, a dual MIMO system, where a high efficiency MIMO is used as the primary power source, embodying the principles of the disclosure. The primary power source 410 is optimized to provide high operating efficiency across a wide load range. This MIMO may be either a symmetrical multi-phase buck converter or an asymmetrical multi-phase buck converter, where symmetrical refers to phases having similar characteristics, such as similar inductance values and switching frequencies, and asymmetrical to a multiphase converter having phases with characteristics that differ from one another. The first MIMO is not the focus of the present disclosure.

A second MIMO 450 is used to provide peak boost energy to individual cores 430 during high transient load periods. Three cores 430 are shown by example only, but there alternately can be two, four, or more cores. It is critical that this MIMO is located in close proximity to the cores as it is important to minimize the effect of parasitic elements in 420. Since high dI/dt periods of each core are very short, and the periods of overlap can be avoided (or minimized) by controlling when each core initiates a high dI/dt period, the second MIMO power converter can be much smaller in size and power capacity than the sum of all the individual booster power converters as shown in FIG. 3.

Figure 3:
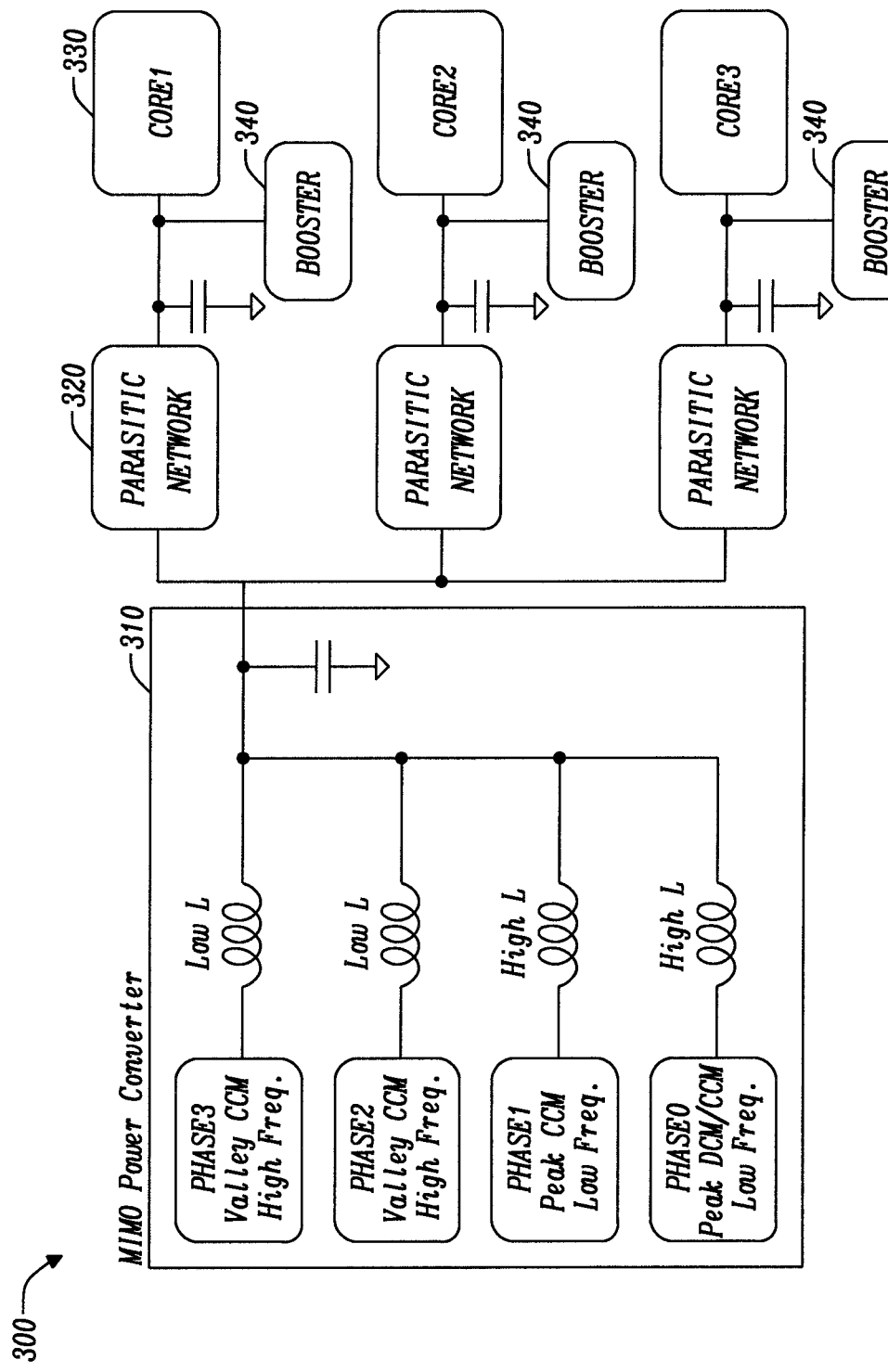
FIG. 3 illustrates a prior art architecture where the poor transient performance of the power converter shown in FIG. 2 is addressed, with a Multi-Inductor/Multi-Output (MIMO) Converter.
Figure 5:
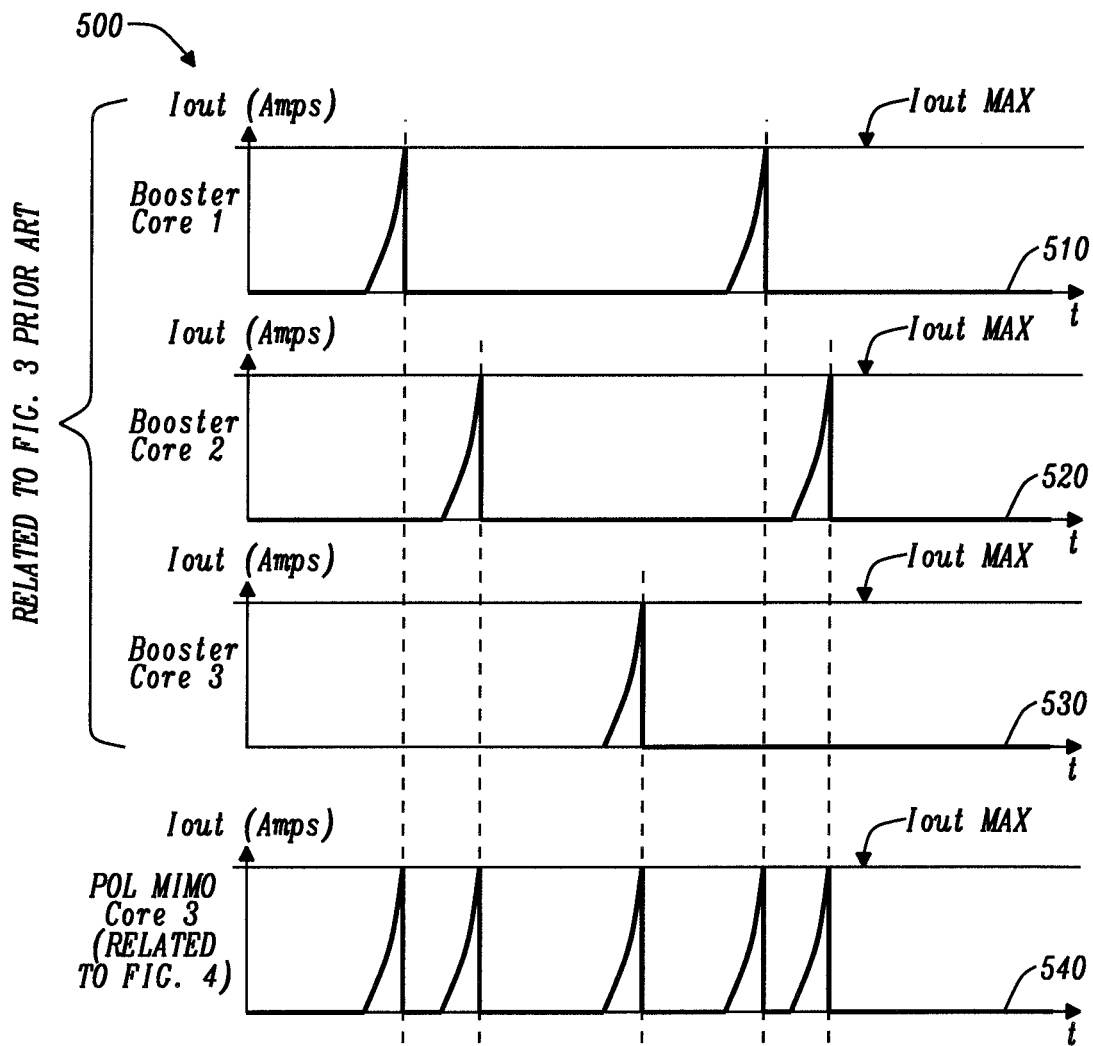
FIG. 5 illustrates output current waveforms of the three booster power converters of the prior art FIG. 3, and of the dual MIMO system of FIG. 4.

FIG. 5 illustrates 500, where in the top portion output current waveforms of the three booster power converters of the prior art FIG. 3, and of the dual MIMO system of FIG. 4, are shown. These relate to the three dedicated booster power converters for each high dI/dt core described in FIG. 3—Booster Core 1 is represented by waveform 510, Booster Core 2 is represented by waveform 520, and Booster Core 3 is represented by waveform 530. Each booster power converter must be designed to provide a minimum current as demanded by the individual core. In the case illustrated in FIG. 5, the maximum booster current Iout MAX is shown to be equal, but this does not need to be the case.

The bottom portion of FIG. 5 illustrates the present disclosure, where a single MIMO power converter 450 provides transient load current to all three high dI/dt cores 430. Notice that there is no overlap of the high dI/dt events, due to coordinating the timing of high dI/dt periods among the three cores. In this case, the peak current rating of the MIMO power converter 540 is equal to each of the individual booster circuits 340 from FIG. 3.

Figure 6A:
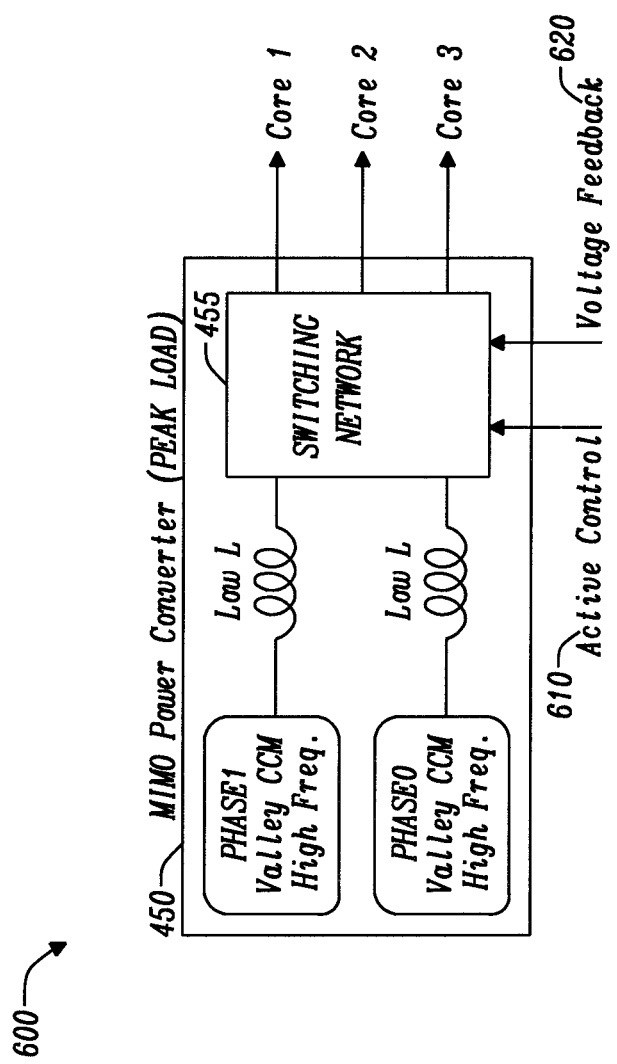
FIG. 6A illustrates the ability for a single MIMO power converter to be coupled to the appropriate core input voltage terminal.

FIG. 6A illustrates 600, where one of the key elements of the present disclosure is the ability for a single MIMO power converter to be coupled to the appropriate core input voltage terminal. A switching network 455 is provided to couple and de-couple the MIMO power converter 450 to each of the high dI/dt Core 1-3 input voltage terminals. In order to determine the connectivity of the switching network, a number of input signals, or combination of signals, can be used. Two examples are shown in FIG. 6A. The first, involves the sensing of the input voltage terminal of each core via Voltage Feedback 620. When a core initiates a high dI/dt, cycle, the input voltage will start to droop. Once a voltage droop is detected at an input terminal of a core, the switching network will couple the MIMO power converter to that input voltage terminal.

Figure 6B:
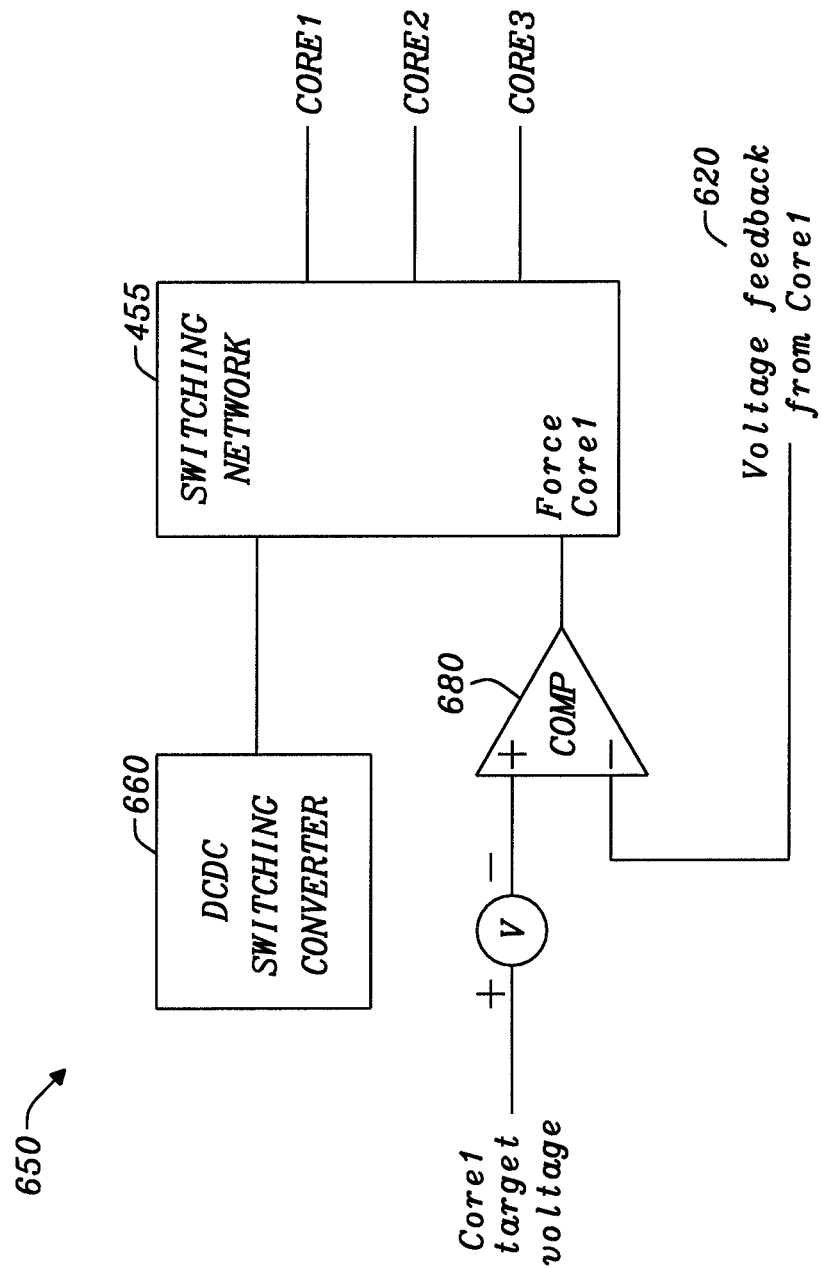
FIG. 6B illustrates how the system is designed to detect voltage droop, when the supply voltage of a core falls more than 10 mV below the target voltage.

One of the simplest ways to detect voltage droop is to detect when the supply voltage to a load (output voltage of the converter) drops below the target voltage. In the FIG. 6B, system 650 is designed to trigger when the supply voltage for Core 1 falls more than 10 mV below the target voltage. The target voltage is an input for the system. A voltage source is used to create a reference voltage 10 mV below the target voltage. This is compared with the supply voltage for Core 1 using voltage feedback 620 from this core. Comparator 680 will fire when the supply voltage for core 1 falls too low. This will then force the switching network 455 to select the output for Core 1, and the DCDC switching converter 660 will then supply Core 1, and prevent further voltage droop at this load.

Also, in a more predictive fashion, a core or higher layer controller can anticipate when a high dI/dt event will occur and provide Active Control 610. Just prior to this event, the switching network will couple the MIMO power converter to that core. Another advantage of the switching network is to provide fault protection, for example, preventing an over-load condition of the MIMO power converter.

If a load is taking too much current from the DCDC switching converter, then the load could be damaged, or the converter itself could be damaged. The switching network 455 could be used to isolate the load from the converter and prevent damage. In one example this could be done using a similar scheme to the droop detection. If the load is taking more current than the converter can supply, then the voltage at the load will collapse. This voltage drop can be detected and the switching network can isolate the load, preventing damage (the load voltage will collapse fully and the load will reset). Another example would be to detect the current being used by the load. In this example the switching network 455 could provide the functionality of a current limited switch—detecting and limiting the current provided to the load.

Figure 7:
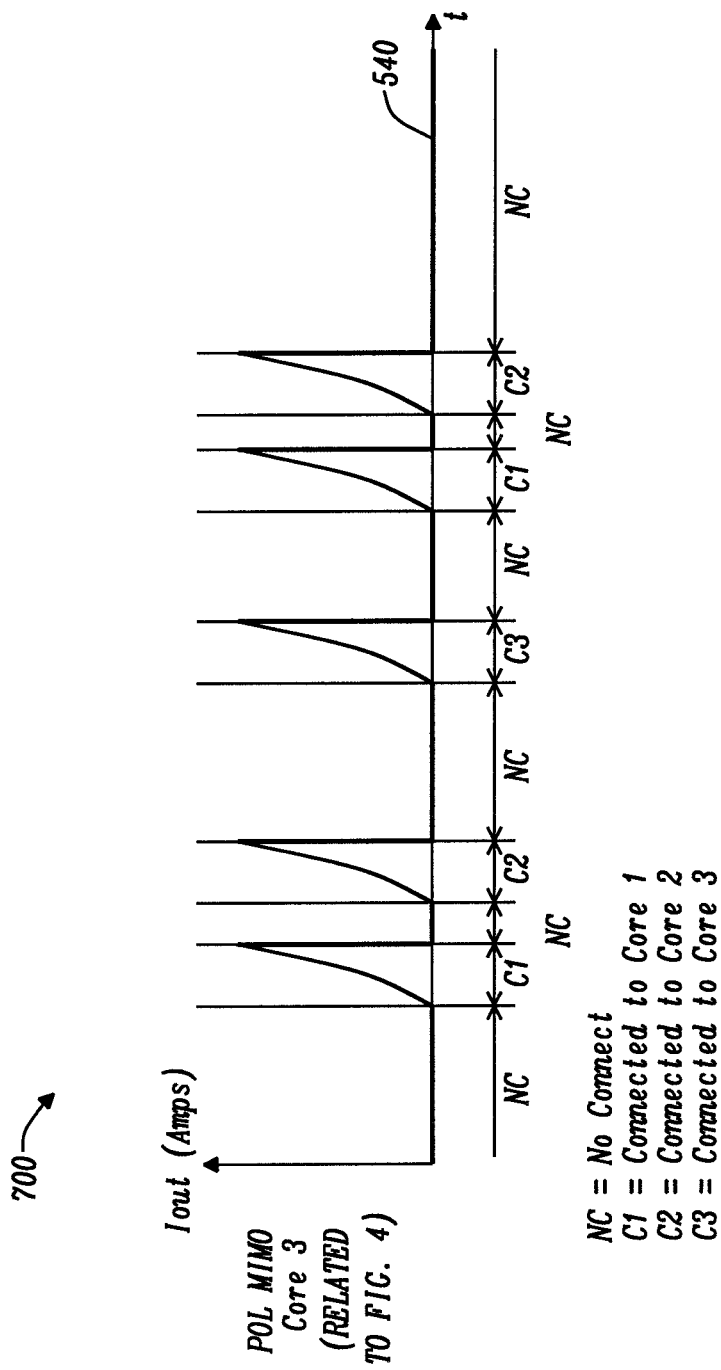
FIG. 7 illustrates an example of the switching network operation, in the present disclosure.

FIG. 7 illustrates 700, an example of the switching network operation, in the present disclosure. Using the waveforms of FIG. 5, the state of the switching network is shown. A single MIMO power converter 450 provides transient load current 540 to all three high dI/dt cores 430. There is no overlap of the high dI/dt events. NC indicates No Connection of the MIMO power converter to the cores, C1 indicates the MIMO power converter is connected to Core 1, C2 indicates the MIMO power converter is connected to Core 2, and C3 indicates the MIMO power converter is connected to Core 3.

Figure 8:
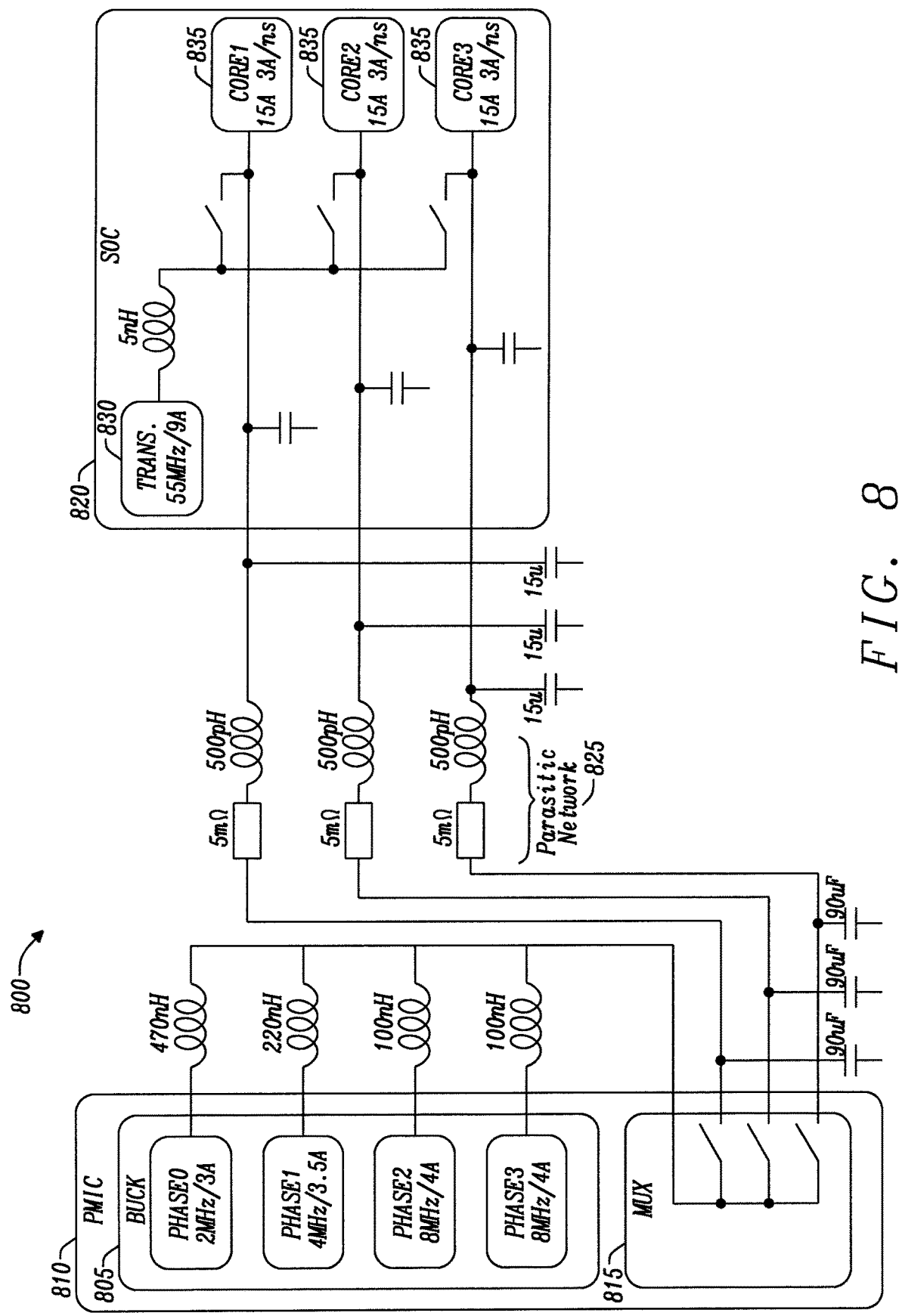
FIG. 8 illustrates a particular embodiment of the present disclosure, where a transient phase, i.e., the MIMO power converter as shown previously, is multiplexed between many core loads.

FIG. 8 illustrates 800, a particular embodiment of the present disclosure, where a transient phase, i.e., the MIMO power converter 450 as shown previously, is multiplexed between many core loads. The loads are only drawing current from the transient phase for <1% of the time. Therefore it makes sense to share the transient phase between many loads. The transient phase offers a benefit in terms of load transient response, in a real application. It is possible to drive multiple core loads from a multiplexer (MUX) 815, i.e., a switching network, and that this offers a bill of material (BOM) benefit compared to the alternative scenario of providing a buck converter 805 per load. The transient phase may be placed in a single Power Management Integrated Circuit (PMIC) 810 or in a separate System on a Chip (SOC) 820, as shown in FIG. 8, as the present disclosure covers both scenarios. Particular operating frequencies, current capabilities, and inductor values are shown, as examples only, for each of the buck converter 805 phases. MUX 815 is shown located on the same PMIC 810 as the buck converter 805. A parasitic network 825, comprising example resistance and inductance values are shown between MUX 815 and SOC 820. The transient phase/MIMO power converter 830 is shown with an exemplary operating frequency, current capability, and inductor value. Cores 835 are shown with exemplary maximum current loads and current ramp rates.

Figure 9:
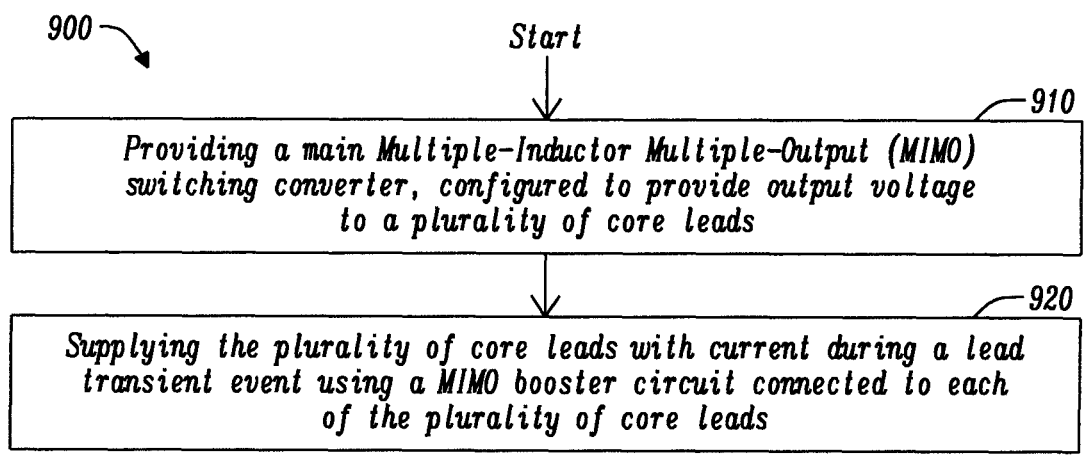
FIG. 9 is a flow chart of a method for supporting multiple high dI/dt loads in a DC-DC power converter.

FIG. 9 is flow chart 900 of a method of operating a dual MIMO DC-DC power converter. The steps include 910, providing a main Multiple-Inductor Multiple-Output (MIMO) switching converter, configured to provide output voltage to a plurality of core loads. The steps also include 920, supplying the plurality of core loads with current during a load transient event, using a MIMO booster circuit connected to each of the plurality of core loads.

The main advantages of one or more embodiments of the present disclosure include a lower component count and a reduced PCB footprint to support multiple cores in a Multiple-Inductor Multiple-Output. The disclosure makes use of the low duty-cycle of the power peaks and the low statistical likelihood of these peaks occurring for all cores simultaneously.

While particular embodiments of the present disclosure have been illustrated and described, it will be understood by those skilled in the art that various changes in form and details may be made without departing from the spirit and scope of the invention.

The invention claimed is:

1. A dual MIMO system for a DC-DC switching converter, comprising:
   a main Multiple-Inductor Multiple-Output (MIMO) switching converter, configured to provide output voltage to a plurality of core loads;
   a MIMO booster circuit connected to each of said plurality of core loads, configured to supply said plurality of core loads with current during a load transient event configured to bypass a parasitic network, and configured for a wider bandwidth and a faster response when compared to the main MIMO switching converter, using only a single set of shared inductors, and
   a switching network configured to provide fault protection and to prevent an over-load condition of the main MIMO switching converter.

2. The dual MIMO system of claim 1, wherein said MIMO booster circuit further comprises a MIMO switching converter, and the switching network is configured to couple and de-couple the MIMO switching converter to a core input voltage terminal of one of said plurality of core loads.

3. The dual MIMO system of claim 2, further comprising a voltage droop detection circuit configured to sense said load transient event on one of the core input voltage terminals when the core input voltage terminal droops, and to couple the main MIMO switching converter to the core input voltage terminal.

4. The dual MIMO system of claim 2, further comprising a core controller configured to anticipate when said load transient event occurs, and to then couple the main MIMO switching converter to the core input voltage terminal.

5. The dual MIMO system of claim 1, wherein the main MIMO switching converter comprises a symmetrical multi-phase buck converter or an asymmetrical multi-phase buck converter.

6. The dual MIMO system of claim 1, wherein the MIMO booster circuit is located closer to said plurality of core loads than to said main MIMO switching converter, to minimize effects of the parasitic network between said main MIMO switching converter and said plurality of core loads.

7. The dual MIMO system of claim 1, wherein said main MIMO switching converter is located in a Power Management Integrated Circuit (PMIC).

8. The dual MIMO system of claim 7, wherein said MIMO booster circuit is located in a System on a Chip (SOC), and separate from said PMIC.

9. The dual MIMO system of claim 1, wherein said MIMO booster circuit is configured to supply current to only one of said core loads at a time.

10. A method of operating a dual MIMO DC-DC power converter, comprising the steps of:
providing a main Multiple-Inductor Multiple-Output (MIMO) switching converter, configured to provide output voltage to a plurality of core loads;
supplying said plurality of core loads with current during a load transient event, using a MIMO booster circuit connected to each of said plurality of core loads, and bypassing a parasitic network, using a wider bandwidth and a faster response when compared to the main MIMO switching converter,
supplying said plurality of core loads using only a single set of shared inductors, and comprising a switching network configured to provide fault protection and to prevent an over-load condition of the main MIMO switching converter.

11. The method of claim 10, wherein said MIMO booster circuit further comprises a MIMO switching converter, and coupling and de-coupling the MIMO switching converter to a core input voltage terminal of one of said plurality of core loads, using the switching network.

12. The method of claim 11, further comprising a voltage droop detection circuit for sensing said load transient event on one of the core input voltage terminals when the core input voltage terminal droops, and coupling the main MIMO switching converter to the core input voltage terminal.

13. The method of claim 11, further comprising a core controller for anticipating when said load transient event occurs, and coupling the main MIMO switching converter to the core input voltage terminal.

14. The method of claim 10, wherein the MIMO booster circuit is located closer to said plurality of core loads than to said main MIMO switching converter, and minimizes effects of the parasitic network between said main MIMO switching converter and said plurality of core loads.

15. The method of claim 10, wherein said MIMO booster circuit supplies current to only one of said core loads at a time.

* * * * *